United States Patent [19]

Schmidt

[11] Patent Number: 4,755,122
[45] Date of Patent: Jul. 5, 1988

[54] WEIGHT REGULATOR FOR A CONTROLLABLE INJECTION MOULDING MACHINE

[75] Inventor: Fred Schmidt, Hamburg, Fed. Rep. of Germany

[73] Assignee: U.S. Philips Corp., New York, N.Y.

[21] Appl. No.: 923,532

[22] Filed: Oct. 27, 1986

[30] Foreign Application Priority Data

Oct. 30, 1985 [DE] Fed. Rep. of Germany ....... 3538516

[51] Int. Cl.$^4$ .............................................. B29C 45/77
[52] U.S. Cl. .................................. 425/140; 264/40.4; 425/145; 425/169
[58] Field of Search ............... 425/135, 140, 143, 148, 425/149, 169, 172, 145; 264/40.4

[56] References Cited

U.S. PATENT DOCUMENTS

| | | | |
|---|---|---|---|
| 2,675,583 | 4/1954 | Scherry | 425/140 |
| 3,910,737 | 10/1975 | Schmida et al. | 425/141 |
| 4,142,847 | 3/1979 | Ripani | 425/140 |
| 4,452,579 | 6/1984 | Janson | 425/140 |

OTHER PUBLICATIONS

"Prozessautomatisierung Beim Extrudieren und Spritzgiessen von Kunststoffen", Dr. Ing. H. G. Wiegand, Carl-Hansen-Verlag Munchen-wien 1979, pp. 179–185.

Primary Examiner—Jay H. Woo
Assistant Examiner—Timothy W. Heitbrink
Attorney, Agent, or Firm—Norman N. Spain

[57] ABSTRACT

The weight regulator for an injection moulding machine (1) to be controlled by a process regulator (13) comprises a circuit arrangement (15) for determining a final pressure adjustment value from the predetermined nominal weight of the injection-moulded parts to be manufactured by the injection moulding machine (1), a subtraction device (16), which forms the difference between the nominal weight and the actual weight of the injection-moulded parts produced by the injection moulding machine (1) delivered by an analytic balance (12), an integrator (17) for producing a correction value from the difference between the actual weight and the nominal weight an an adder (18) which is connected between the circuit arrangement (15) and the process regulator (13) and which adds the correction value to the final pressure adjustment value so that a nominal value of the final pressure is obtained that can be supplied to the process regulator (13).

5 Claims, 1 Drawing Sheet

WEIGHT REGULATOR FOR A CONTROLLABLE INJECTION MOULDING MACHINE

BACKGROUND OF THE INVENTION

The invention relates to a weight regulator for an injection-moulding machine to be controlled by a process regulator and comprising a circuit arrangement for determining a value for the final pressure adjustment from a predetermined nominal weight of the injection-moulded parts to be produced by the injection-moulding machine.

The book "Prozessautomatisierung beim Extrudieren und Spritzgiessen von Kunststoffen" by Dr. Ing. H. G. Wiegand, Carl-Hansen-Verlag München-Wien 1979, p. 179-185 discloses a process regulation system for a controllable injection-moulding machine comprising a circuit arrangement in the form of a micro-computer, to which is supplied a quantity corresponding to the nominal weight of an injection-moulded part and from which there is calculated, with the aid of model equations, a pressure profile for the final pressure phase of the injection-moulding machine. This pressure profile is supplied to a final pressure control circuit of the injection-moulding machine as a nominal value, as a result of which the weight of the injection-moulded part is adjustable by way of the final pressure. With the aid of model equations, the pressure profile is calculated from a predetermined nominal weight only on approximation, however, because changes of the injection-moulding material occurring during the production or disturbances in the injection-moulding machine cannot be taken into account with the use of mode equations, which are fed into the microcomputer before the beginning of the production and then remain unchanged. As a result, permanent deviations of the actual weight from the adjusted nominal weight of the injection-moulded parts are obtained.

SUMMARY OF THE INVENTION

The invention has for its object to provide a weight regulator for a controllable injection-moulding machine, which adjusts the weight of injection-moulded parts to a predetermined nominal value.

This object is achieved by including in the weight regulator of the kind mentioned in the opening paragraph a subtraction device, which forms the difference between the nominal weight and the actual weight of the injection-moulded parts manufactured by the injection-moulding machine delivered by an analytical balance and supplies it to an integrator for producing a correction value, which is added by an adder arranged between the circuit arrangement and the process regulator to the final pressure adjustment value so that a nominal value for the final pressure is obtained that can be supplied to the process regulator.

If the injection-moulded part is too light or too heavy, the correction value produced by the integrator has a positive or negative value, which increases or decreases the nominal value for the final pressure supplied to the process regulator and hence also the weight of the injection-moulded part. As a result, changes in weight and form of the injection-moulded parts occurring during the production are controlled.

For automatizing the weight regulation, it is advantageous when the injection-moulded part can be automatically transported to the analytic balance by a transport device.

A circuit arrangement for determining the final pressure adjustment value comprising a first subtraction member, to the non-inverting input of which can be supplied the nominal weight of the injection-moulded part and to the inverting input of which can be supplied the weight of that quantity of the melt which can be fed into the injection mould of the injection-moulding machine during the injection phase, a multiplier for forming the product from a first adjustable coefficient and a quantity corresponding to the average temperature of the melt, a second subtraction member, the non-inverting input of which is connected to the output of the first subtraction member and the inverting input of which is connected to the output of the multiplier, and a divider for forming the quotient from the quantity delivered by the second subtraction member and a second adjustable coefficient, to the output of which is applied the final pressure adjustment value, is constructed in a simple manner and therefore can be manufactured at low cost. Moreover, such a circuit arrangement, which can be composed both of analogue and of digital calculation members, operates in a very reliable manner.

DETAILED DESCRIPTION OF THE INVENTION

The weight regulator can control machine defects, which cause solely a small change of the weight of the injection-moulded part, such as, for example, the failure of one of several temperature zones provided at the worm space of the injection-moulding machine, by changing the final pressure. In the case of larger machine defects, however, a permanent change in weight of the injection-moulded part is obtained which cannot be controlled again and which leads to a steady increase of the correction value produced by the integrator. If the amount of this correction value exceeds a maximum limit value, an alarm can be given for machine monitoring if the output of the integrator is connected to a threshold value switch, which drives an alarm device producing an alarm by a signal if the correction value exceeds a predetermined amount.

Figure 1:
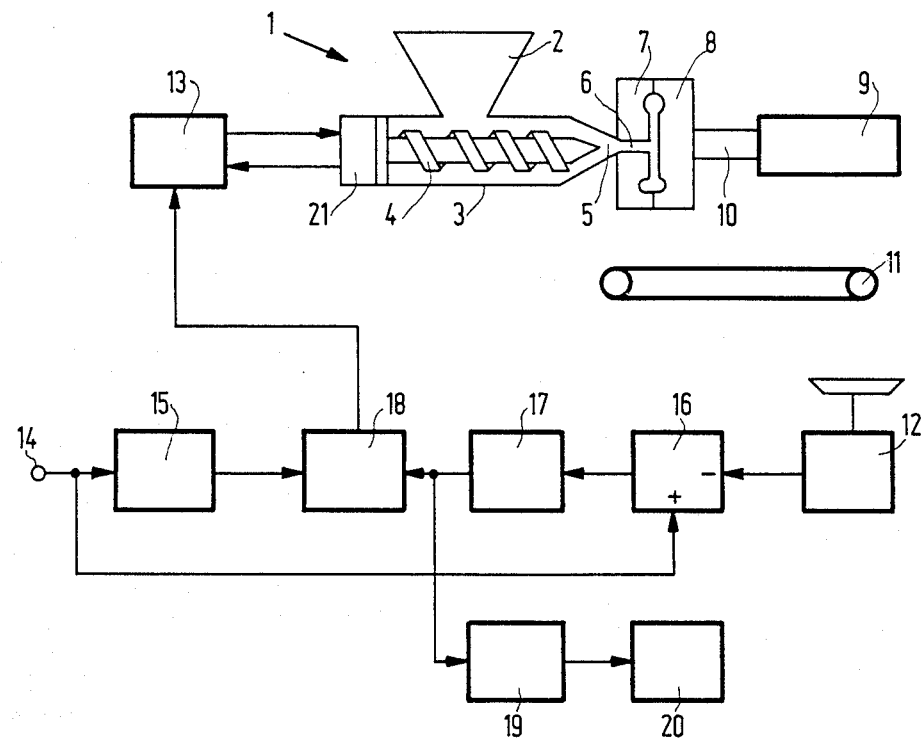
FIG. 1 is a diagrammatic view of an injection molding machine provided with a process regulator and a weight regulator of the invention.

The injection-moulding machine 1 shown diagrammatically in FIG. 1 has a funnel 2, through which a plastic granulate can be fed into a worm-gear housing 3, in which a rotatably and axially displaceable worm 4 is arranged. An injection nozzle 5 of the worm-gear housing 3 is pressed during the mould-filling process against a conduit 6 of a mould part 7 of an injection mould, whose other mould part 8 is secured to the piston 10 of a hydraulic drive, which piston is passed into a cylinder 9.

Below the injection mould 7,8 is arranged a transport device 11, which is, for example, in the form of a transport belt and transports cured injection-moulded parts ejected from the injection mould 7,8 to the analytic balance 12.

By means of a process regulator 13, the pressures of the hydraulic liquids required for the axial movement of the worm 4 and the hydraulic drive 9,10, the temperature of the melt contained in the worm-gear housing 3, the speed of rotation of the worm 4, the pressure of the melt injected into the injection mould 7,8 during the injection phase and the final pressure are regulated. This final pressure is required for injecting additional melt into the injection mould 7,8 during the final pressure phase when the melt contained in the injection mould 7,8 cures and the dimensions of the injection-moulded part are reduced.

Since the weight of an injection-moulded part can be changed by 2 to 3% by the control of the final pressure, the process regulator 13 is driven by a weight regulator with the nominal value of the final pressure to be adjusted, which value is determined in the weight regulator by comparison of the nominal weight to be supplied through the terminal 14 with the actual weight of the injection-moulded part to be delivered by the analytic balance 12.

The weight regulator comprises a circuit arrangement 15, which may be constructed as a microcomputer or as an analogue calculator (cf. FIG. 2) and calculates a final pressure adjustment value from the nominal weight to be supplied through the terminal 14 with the aid of a model equation describing the injection-moulding process. Since the model equation then describes the injection-moulding process only in approximation, the final pressure adjustment value also represents only an estimated value, which, when supplied to the process regulator 13 as a final pressure adjustment value, results in injection-moulded parts whose weight corresponds only on approximation to the nominal weight to be supplied through the terminal 14.

For correction of the weight errors then occurring, a subtraction device 16 is provided, which subtracts the actual weight of the injection-moulded part determined by the analytic balance from the nominal weight and supplies the difference of these two values to an integrator 17, which determines therefrom a correction value, which in accordance with the deviation of the actual weight from the nominal weight, has a positive or negative sign and is added in the adder 18 to the final pressure adjustment value determined by the circuit arrangement 15. The sum results in the nominal value of the final pressure, which on an average corresponds to the final pressure adjustment value, but which is larger than the final pressure adjustment value when the actual weight of the injection-moulded part is smaller than its nominal weight and which is smaller than the final pressure adjustment value when the actual weight of the injection-moulded part is larger than its nominal weight. The nominal value of the final pressure is supplied by the adder 18 to the process regulator 13, which adjusts inter alia during the final pressure phase the pressure of the hydraulic liquid flowing into the cylinder space 21 and producing an axial pressure of the rotating worm 4 in the direction of the injection nozzle 5 to the supplied nominal value of the final pressure.

The output of the integrator 17 is connected to a threshold value switch 19, which drives an alarm device 20 each time with a signal producing an alarm when the correction value delivered by the integrator 17 has an amount exceeding a predetermined maximum value.

Before the beginning of the series production of an injection-moulded part, first the effects of the height of the final pressure and of the temperature of the melt on the weight of the injection-moulded part are examined with the aid of a few test samples. For this purpose, at each test sample, the final pressure and the temperature of the melt are measured and the weight of the injection-moulded part and moreover the weight of that quantity of the melt are weighed which is injected into the injection mould 7,8 during the injection phase i.e. before the beginning of the final pressure phase. It is then determined how the weight of the injection-moulded part changes upon variations of the final pressure when the temperature and the quantity of the melt remain constant during the injection phase. The quotient from weight change per variation of final pressure results in a coefficient a.

It is further measured how the weight of the injection-moulded part changes upon variation of the temperature of the melt when the final pressure and the weight $G_S$ of the melt remain constant during the injection phase. The quotient from weight variation per variation of the temperature of the melt results in a coefficient b.

From this results the model equation for the weight g of the injection-moulded part in dependence upon the final pressure adjustment value p, upon the temperature of the melt T, upon the coefficients a and b and upon the weight $G_S$ of that quantity of the melt which reaches the injection mould during the injection phase:

$$g = ap + bT + G_S.$$

With the aid of this model equation, the final pressure adjustment value p can be determined as a function of the nominal weight g when as temperature value T and as weight value $G_S$ the average values of the temperatures and weight quantities of the melt are used in the following relation:

$$p = (g - bT - G_S)/a.$$

The circuit arrangement 15 for determining the final pressure adjustment value p can be constructed as a microcomputer, which is programmed with the relation for calculating the final pressure adjustment value p and in which the quantities a, b, T and $G_S$ can be stored at storage locations.

Figure 2:
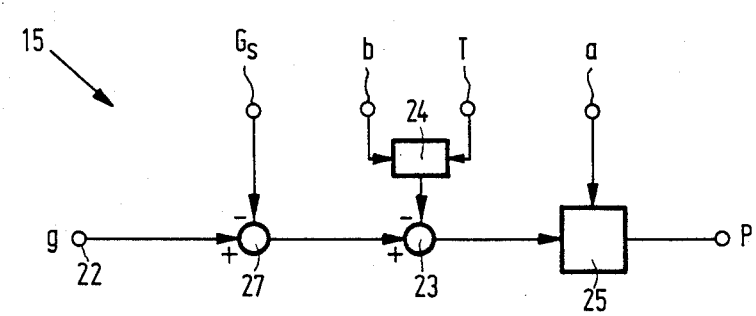
FIG. 2 shows an embodiment of the circuit arrangement for determining the final pressure adjustment value.

The circuit arrangement 15 may also be constructed as an analog calculator as shown in FIG. 2, to which the quantities a, b, T and $G_S$ can be supplied each through a connection, for example with the use of potentiometer circuits.

The nominal weight g of the injection-moulded part manufactured by means of the injection-moulding machine 1 is supplied through the terminal 14 to the circuit arrangement 15, which determines therefrom the final pressure adjustment value p. The correction value produced by the integrator 17 is first zero because an injection-moulded part has not yet been manufactured and weighed by the analytic balance 12. The final pressure adjustment value p is therefore supplied as nominal value of the final pressure to the process regulator 13, which adjusts with the aid of this nominal value the final pressure of the melt to the injected additionally after termination of the injection phase into the injection mould 7, 8.

After termination of the final pressure phase, the injection mould 7, 8 is opened; the injection-moulded part is brought by means of the transport device 11 is the the analytic balance 12 and is weighed. The actual weight of the injection-moulded part, then determined by the analytic balance 12 is supplied to the inverting input of the subtraction device 16, which is driven through its non-inverting input with the nominal weight g and which supplies the difference between nominal weight and actual weight to the integrator 17.

When the injection-moulded part is, for example, too light, the difference between nominal weight and actual weight is positive so that a positive value is supplied to the integrator 17 and consequently the final pressure adjustment value p is increased in the adder 18. The resulting nominal value of the final pressure supplied to the process regulator 13 is therefore larger than the calculated final pressure adjustment value and ensures that the final pressure of the melt is increased. As a result, the weight of the injection-moulded part can be increased by about 2% to 3%.

When after increase of the final pressure the weight of the injection-moulded part determined by the analytic balance 12 is still smaller than the nominal weight g to be supplied through the terminal 14, a positive value is further supplied to the integrator 17 so that the correction value then determined increases and the nominal value of the final pressure is also increased. Consequently, several test samples may be required until the actual weight of the injection-moulded part corresponds to a predetermined nominal weight.

Errors of the injection-moulding machine 1 and errors in the programming of the circuit arrangement 15 can result in that the deviation of the actual weight from the nominal weight is too large and hence can no longer be controlled. A value deviating from zero is then supplied after each test sample by the subtraction device 16 to the integrator 17 so that the correction value produced by the integrator 17 varies until its amount exceeds a limit value stored in the threshold value switch 19. Subsequently, the threshold value switch 19 drives an alarm device 20 with a signal for producing an alarm.

The circuit arrangement 15 may be constructed as an analog calculator as shown in FIG. 2, which determines the final pressure adjustment value p with the aid of the aforementioned relation and which comprises a first subtraction member 27, to the non-inverting input 22 of which can be supplied the nominal weight g and to the inverting input of which can be supplied a quantity corresponding to the weight $G_S$ of that part of the melt which reaches during the injection phase the injection mould of the injection-moulding machine. The output of the first subtraction member 27 is connected to the non-inverting input of a second subtraction member 23, whose inverting input is driven by a multiplier 24 with the product from the coefficient b and the quantity T corresponding to the average temperature of the melt. The output of the second subtraction member 23 is connected to a divider 25, which divides the calculation result supplied by the second subtraction member 23 by the coefficient a and determines therefrom the final pressure adjustment value p. The quantities $G_S$, b T and a can be supplied to the circuit arrangement 15 in the form of an analog calculator through controllable voltage sources and through potentiometer circuits, respectively.

What is claimed is:

1. A weight regulator for an injection moulding machine (1) to be controlled by a process regulator (13) comprising a circuit arrangement (15) for determining a final pressure adjustment value from a predetermined nominal weight of the injection-moulded part to be produced by the injection-moulding machine, characterized by a subtraction device (16), which forms the difference between the nominal weight and the actual weight of the injection-moulded parts manufactured by the injection-moulding machine delivered by an analytic balance (12) and supplies this difference to an integrator (17) for producing a correction value, which correction value is added by an adder (18) connected between the circuit arrangement (15) and the process regulator (13) to the final pressure adjustment value so that a nominal value of the final pressure is obtained that can be supplied to the process regulator (13).

2. A weight regulator as claimed in claim 1, characterized in that the injection-moulded parts can be automatically transported by a transport device (11) to the analytic balance (12).

3. A weight regulator as claimed in claim 1, characterized in that the integrator (17) is connected through its output to a threshold value switch (19), which drives an alarm device (20) with a signal for producing an alarm when the correction value exceeds a predetermined amount.

4. A weight regulator for an injection molding machine (1) controllable by a process regulator (13) comprising a circuit arrangement (15) for determining a final pressure adjustment value from a predetermined nominal weight of the injection-molded part to be produced by the injection-molding machine, characterized by a subtraction device (16), which forms the difference between the nominal weight and the actual weight of the injection-molded parts manufactured by the ejection molding machine delivered by an analytic balance (12) and supplies this difference to an integrator (17) for producing a correction value, which correction value is added by an adder, (18) connected between the circuit arrangement (15) and the process regulator (13), to the final pressure adjustment value so that a nominal value of the final pressure is obtained, which nominal value can be supplied to the process regulator (13) and wherein the circuit arrangement (15) for determining the final pressure adjustment value comprises a first subtraction member (27), provided with a non-inverting input (22) and an inverting input, to the non-inverting input (22) of which there can be supplied the nominal weight (g) of the injection-molded part and to the inverting input of which there can be supplied the weight ($G_S$) of that quantity of a melt which can be supplied during the injection phase to the injection mold (7,8) of the injection molding machine (1); a multiplier (24) for forming the product from a first adjustable coefficient (b) and a quantity corresponding to the average temperature (T) of the melt; a second subtraction member (23), provided with a non-inverting input connected to the output of the first subtraction (27) and provided with an inverting input connected to the output of the multiplier (24); and a divider (24) for forming the quotient from the quantity delivered by the second subtraction member (23) and a second adjustable coefficient (a), to the output of which the final adjustment value (p) is applied.

5. A weight regulator as claimed in claim 4, characterized in that the integrator (17) is connected through its output to a threshold value switch (19), which drives an alarm device (20) with a signal for producing an alarm when the correction value exceeds a predetermined amount.

* * * * *